Figure 1:
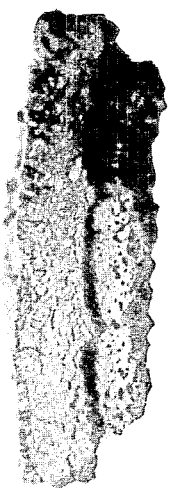

United States Patent [19]

Kummer et al.

[11] Patent Number: 4,513,089

[45] Date of Patent: Apr. 23, 1985

[54] SUPERREFRACTORY DRY RAMMING MATERIAL BASED ON ZIRCONIUM OXIDE FOR THE LINING OF INDUCTION-TYPE CRUCIBLE FURNACES

[75] Inventors: Peter Kummer, Siegburg; Gerhard Rehfeld, Aachen, both of Fed. Rep. of Germany

[73] Assignee: Dynamit Nobel AG, Cologne, Fed. Rep. of Germany

[21] Appl. No.: 545,479

[22] Filed: Oct. 25, 1983

Related U.S. Application Data

[63] Continuation of Ser. No. 307,258, Sep. 30, 1981, abandoned.

[30] Foreign Application Priority Data

Oct. 2, 1980 [DE] Fed. Rep. of Germany ....... 3037268

[51] Int. Cl.$^3$ .............................................. C04B 35/48
[52] U.S. Cl. .................................. 501/103; 501/104; 501/106
[58] Field of Search ..................... 501/103, 104, 106

[56] References Cited

U.S. PATENT DOCUMENTS

| 3,261,698 | 7/1966 | Whittemore et al. | 501/103 |
| 3,620,781 | 11/1971 | Garvie | 501/104 |
| 3,887,387 | 6/1975 | Sturhahn | 501/104 |
| 3,899,341 | 8/1975 | Schwarz | 501/103 |

OTHER PUBLICATIONS

Strakhov, et al., "Slag-Resistant Products Made From Stabilized ZrO$_2$", Translated from Ogneupory, No. 3, pp. 54–57, Mar. 1979.

Karaulov, et al., "Zirconia Ramming Compounds Tested in Induction Furnaces", Translated from Ogneupory, No. 4, pp. 39–42, Apr. 1974.

*Primary Examiner*—Mark Bell
*Attorney, Agent, or Firm*—Felfe & Lynch

[57] ABSTRACT

A superrefractory dry ramming material based on zirconium oxide for the lining of induction-type crucible furnaces comprising a zirconium oxide low in SiO$_2$ and conventionally stabilized with CaO, MgO, Y$_2$O$_3$, rare earths or their mixed oxides which has a particle size ranging from 0 to 8 mm, and from 5 to 40 weight percent finely divided monoclinic, fused zirconium oxide containing less than 0.5 weight percent SiO$_2$.

7 Claims, 2 Drawing Figures

SUPERREFRACTORY DRY RAMMING MATERIAL BASED ON ZIRCONIUM OXIDE FOR THE LINING OF INDUCTION-TYPE CRUCIBLE FURNACES

This is a continuation application of Ser. No. 307,258, filed Sept. 30, 1981, now abandoned.

The invention relates to a superrefractory dry ramming material based on zirconium oxide.

More specifically, the ramming material of the invention is for the lining of induction-type crucible furnaces for the production of high-alloy special steels, nickel-based alloys, alloys on a chromium and nickel basis, and special alloys both in open induction-type crucible furnaces and in melting units operated under vacuum or protective gas with melting temperatures of 1650° C. and up.

Under such conditions, refractory materials are exposed to maximum stresses due to the liquid metal. Because of its alloying elements, such as nickel, chromium, cobalt, manganese, silicon, tungsten and niobium, alloyed cast steel makes extreme chemical and physical demands on the refractory lining.

The chemical stresses to which the refractory material is subject are due to reactions into which the refractory material enters with the special steel itself and with the non-metallic, oxidic slag constituents stemming from the charge. In addition, the lining is subject to severe physical stresses due to temperature changes in the heating, charging and discharging of the furnace and to the temperature gradients between the inside which is in contact with the molten material and the outside, and also to the pronounced motion of the bath of inductively heated molten charge. These stresses promote the penetration of the melt into the ramming material and may result in untimely rupture of the furnace.

Induction-type crucible furnaces with tapping temperatures of 1650° C. and up are lined mainly with basic or chemically neutral ramming materials. Acidic linings made from materials such as quartzite, quartz and zirconium silicate are also suited for use. (See Giessereipraxis [Foundry Practice], 1979, No. 7, p. 111.)

Basic linings are produced mainly from sintered or fused magnesite, optionally with additions of $Al_2O_3$, $ZrO_2$, $ZrSiO_4$ and other mineralizers, while in chemically neutral materials fused or sintered corundum is the principal component, to which magnesium oxide may have been added. The addition of MgO serves to improve the hot strength of these materials through spinel formation during the melting operation.

To describe the mode of action of linings of induction furnaces made from ramming materials, a three-zone model is utilized. The innermost zone of the cylindrical lining, which is in contact with the melt, is densely sintered and directly exposed to the erosive attack of the melt and of the slags.

The middle zone located behind the inner zone has the function of positively checking further penetration by the liquid melt which seeped through the inner, sintered zone through cracks, and also to exert, through volume enlargement due to temperature-dependent changes of crystal modifications or through topochemical reactions, radial pressure on the inner, sintered zone which is apt to reduce the size of cracks in the sintered zone or to close them. The third, outer zone consisting of unaltered ramming material essentially serves as a back-up zone which takes over the functions of the middle zone as erosion of the sintered zone progresses. It is apparent from the functions of the individual zones that the middle zone must not sinter prematurely, and that the particle-size composition of the ramming material is an important factor.

In Ogneupory, No. 4 (Apr., 1974), pp. 39–42, the behavior in induction furnaces of ramming mixtures of 80% partially stabilized zirconium oxide and 20% monoclinic zirconium oxide containing a binder activated by fine grinding is investigated with respect to mechanical strength and to resistance to the breaking away of pieces of the inner, sintered zone in the heating of molybdenum specimens.

A refractory dry ramming material containing as basic chief constituent at least 96 weight percent MgO and/or CaO is described in German patent application DAS No. 25 52 150.

Published European patent application No. 0 005 482 discloses a dry refractory ramming material for the lining of induction-type crucible furnaces based on an $Al_2O_3$ material and including spinel-forming additives in which special particle-size distributions are utilized.

Ogneupory, No. 3 (March, 1979), pp. 54–57, reports on investigations of the stability of test cups made of refractory materials based on stabilized $ZrO_2$ to attack by acid and basic slag components.

The invention has as its object to provide a novel superrefractory dry ramming material for use in the melting of high-alloy special steels, nickel-based alloys, alloys on a chromium and nickel basis, and special alloys in induction-type crucible furnaces which possesses improved resistance to temperature changes and to cooling-crack formation, improved hot strength with respect to the molten metal at melting temperatures of 1650° C. and up, and increased resistance to premature thorough sintering of the lining.

This is accomplished by a superrefractory dry ramming material based on zirconium oxide low in $SiO_2$ and conventionally stabilized with CaO, MgO, $Y_2O_3$, rare earths or their mixed oxides which has a particle size ranging from 0 to 8 mm, and preferably from 0 to 4 mm to which is added from 5 to 40 weight percent, and preferably from 5 to 20 weight percent, of finely divided monoclinic fused zirconium oxide containing less than 0.5 weight percent, and preferably less than 0.2 weight percent, $SiO_2$.

Most preferred is a material which is based on zirconium oxide stabilized with from 3.7 to 5 weight percent CaO and/or MgO.

FIG. 1 is a photograph of a section through a crucible lining made of a dry ramming material consisting of fused fully stabilized zirconium oxide with 18 weight percent fused monoclinic zirconium oxide after 120 heats. (See Example 1.)

Three zones can be distinguished: A crucible inner wall showing slight infiltration, a sintered zone, and a third zone formed of unsintered loose particles.

Figure 2:
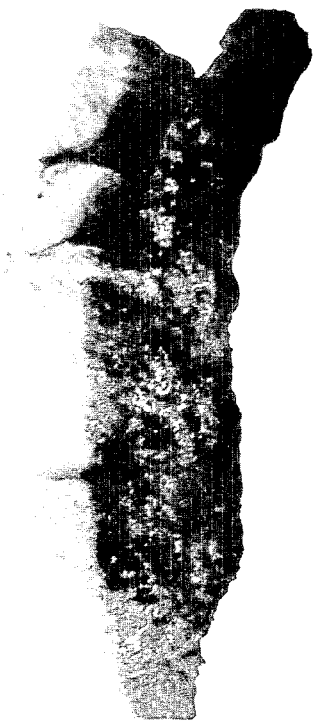

FIG. 2 is a photograph of a section through a crucible lining made of a dry high-alumina, spinel-forming ramming material (with 15% MgO added) after 15 heats. (See Example 1.)

Three zones can be distinguished: A crucible inner wall with pronounced slag buildup, a highly infiltrated intermediate layer, and the third zone which is sintered through to the edge of the crucible.

The stabilized zirconium oxide used in the material in accordance with the invention is melted in an electric arc furnace and the cubic phase of the zirconium oxide is stabilized conventionally with CaO or other additives. The starting material has a $ZrO_2$ content of at least 94 weight percent, including a small percentage of $HfO_2$, a natural accompanying substance. After melting, the material is comminuted conventionally to a size between 0 and 8 mm, and preferably between 0 and 4 mm. The preferred particle size distribution is as follows:

0 to 0.07 mm—15 to 30 wt. %
0.07 to 0.12 mm—5 to 15 wt. %
0.12 to 0.25 mm—5 to 15 wt. %
0.25 to 0.5 mm—5 to 15 wt. %
0.5 to 1.0 mm—5 to 15 wt. %
1.0 to 2.0 mm—5 to 15 wt. %
2.0 to 4.0 mm—15 to 30 wt. % .

The monoclinic zirconium oxide used in the material in accordance with the invention is also melted in an electricarc furnace and then is reduced to a particle size between about 0 and 0.1 mm. This finely divided high-purity material is used in the ramming material in a particle-size range from about 0 to 0.06 mm solely as a binder with an $SiO_2$ content of 0.2 weight percent or less. This fused high-purity monoclinic zirconium oxide offers the advantage over materials produced conventionally by sintering, and also over finely ground natural products, that the individual particles have very low porosity and relatively low sintering action.

Only in this way is the desired slow, readily controllable thorough sintering achieved when the material is used in an induction furnace. Moreover, penetration by the steel melt is checked by the low porosity of the finely divided monoclinic zirconium oxide component. A suitable low porosity can be obtained by materials having compacting densities of at least 4.3 g/cm$^3$ in accordance with other conditions as described below.

The selection of the special particle-size fractions is a decisive factor in the formulation of a sinterable material that will not react with the melt. The special particle size fractions are as follows:

0 to 0.07 mm—15 to 30 wt. %
0.07 to 0.12 mm—5 to 15 wt. %
0.12 to 0.25 mm—5 to 15 wt. %
0.25 to 0.5 mm—5 to 15 wt. %
0.5 to 1.0 mm—5 to 15 wt. %
1.0 to 2.0 mm—5 to 15 wt. %
2.0 to 4.0 mm—15 to 30 wt. %.

Of particular importance in preventing premature sintering, especially with aluminum-killed special steels, is a high degree of purity of the finely divided component of the material. With fully stabilized zirconium oxide materials, and also with zirconium oxide materials containing monoclinic zirconium oxide with a fairly high percentage of impurities, low-melting calcium aluminates and calcium silicates form during the melting process, and these result in premature sintering of the material and thus reduce the useful life of the crucible. The use of a monoclinic zirconium oxide which has been fused by the decomposition of zirconium silicate in an electric-arc furnace and which after cooling and size reduction had been put through a flotation process with addition of saturated or unsaturated higher-molecular-weight fatty acids (see German Pat. No. 11 18 178) has made it possible to employ, after washing with hydrofluoric acid, a monoclinic zirconium low in silicic acid as a component of the formulation. Because of its high-density particles, this high-purity monoclinic zirconium oxide imparts excellent slag resistance to the material.

In accordance with the invention, this advantage is utilized in that the high-purity fused zirconium oxide is used as a component of the ramming material in a particle size ranging from 0 to 0.06 mm and with a silicicacid content of less than 0.2%.

As a rule, the addition of the monoclinic zirconium oxide to the material will range from 5 to 40 weight percent, and preferably from 10 to 20 weight percent. The addition of the fused monoclinic zirconium oxide will improve the thermal-expansion characteristics and the thermal shock resistance of linings made from these materials.

The high melting point of the monoclinic zirconium oxide, about 2700° C., and the stability of the chief component up to about 2500° C. in an oxidizing atmosphere and up to about 2200° C. in a reducing atmosphere preclude the occurrence of liquid phases in the sintered zone under the action of metal melts and slags. The undesired rapid through sintering of the lining thus is also avoided. An important factor in the successful use of the ramming material is the chemical purity of the components used.

EXAMPLE 1

A typical batch for use in the construction of a lining for an induction-type crucible furnace from the material in accordance with the invention consisted of 87 weight percent fused, fully stabilized zirconium oxide containing about 0.3 weight percent $SiO_2$ and having a particle size ranging from 0 to 4 mm and the chemical composition given in Table 1 which follows, and of an addition of 13 weight percent fused monoclinic zirconium oxide containing only 0.1 weight percent $SiO_2$ and having a particle size ranging from 0 to 0.06 mm.

TABLE 1

| | |
|---|---|
| $SiO_2$ | 0.3% |
| $TiO_2$ | 0.1% |
| $Fe_2O_3$ | 0.08 |
| CaO | 4.2% |
| MgO | 0.1% |
| $Al_2O_3$ | 0.08% |
| $Na_2O$ | <0.005% |
| $K_2O$ | <0.005% |
| $ZrO_2$ } $HfO_2$ | 95.1% |

Through screening, the following particle-size fractions were obtained, which were then combined:

TABLE 2

| | |
|---|---|
| 0 to 0.07 mm | 22 wt. % |
| 0.07 to 0.12 mm | 9 wt. % |
| 0.12 to 0.25 mm | 11 wt. % |
| 0.25 to 0.5 mm | 12 wt. % |
| 0.5 to 1.0 mm | 10 wt. % |
| 1 to 2 mm | 13 wt. % |
| 2 to 4 mm | 23 wt. % |

The fraction of stabilized and monoclinic zirconium oxide with a particle-size from 0 to 0.07 mm of the mixture specified in Table 2 had the following trace impurities:

TABLE 3

| | |
|---|---|
| $SiO_2$ | 0.40% |
| $TiO_2$ | 0.11% |
| $Fe_2O_3$ | 0.09% |
| CaO | 2.26% |
| $Al_2O_3$ | 0.06% |

The rammed density of the material was found to be 4.46 g/cm³. A rammed density of at least 4.46 g/cm³ can only be obtained with the above particle-size composition. Such a density is a further requirement if penetration of the material by steel or slag components is to be prevented.

For determination of the sintering behavior, standard test pieces 50 mm in diameter and 50 mm high were prepared from the material described by means of a rammer of the type manufactured by Georg Fischer AG, Schaffhausen. Compacting was done through 25 rammer blows dealt to the test-piece surfaces from both sides. As an aid to homogeneous densification, 2 weight percent Zusoplast 91/11 ® was added to the dry material. After drying at 110° C., the test pieces were fired at different temperatures but with the same holding time in an oxidizing atmosphere in a gas-fired Wistra kiln. The results are presented in Table 4 below.

TABLE 4

| Firing temperature °C. | Holding time h | Bulk density DIN 51065 g/cm³ | Water uptake DIN 51056 Wt. % | Porosity (as open pores) % by vol. | Cold crushing strength DIN 51067 N/mm² |
|---|---|---|---|---|---|
| 1600 | 1 | 4.30 | 5.7 | 24.5 | 24.4 |
| 1650 | 1 | 4.50 | 4.7 | 21.2 | 58.9 |
| 1700 | 1 | 4.51 | 4.7 | 21.2 | 67.4 |
| 1750 | 1 | 4.54 | 4.6 | 21.0 | 74.5 |

EXAMPLE 2

A further extension of the useful life of a crucible was obtained with a material of 82 weight percent of a fused, fully stabilized zirconium oxide of a particle size ranging from 0 to 4 mm and with the composition given in Table 5 which follows and an addition of 18 weight percent of high-purity, fused monoclinic zirconium oxide of a particle size ranging from 0 to 0.06 mm.

TABLE 5

| $SiO_2$ | 0.20% |
|---|---|
| $TiO_2$ | 0.10% |
| $Fe_2O_3$ | 0.08% |
| CaO | 4.0% |
| MgO | 0.1% |
| $Al_2O_3$ | 0.07% |
| $Na_2O$ | 0.005% |
| $K_2O$ | 0.005% |
| $ZrO_2$ $HfO_2$ | 95.4% |

By increasing the percentage of monoclinic zirconium oxide in the material in relation to Example 1, a substantial reduction of the percentage of impurity oxides in the 0 to 0.07 mm fraction was obtained. That fraction, consisting of stabilized and monoclinic zirconium oxide, was found to contain the trace impurities listed in Table 6 below.

TABLE 6

| $SiO_2$ | 0.15% |
|---|---|
| $TiO_2$ | 0.05% |
| CaO | 1.20% |
| $Fe_2O_3$ | 0.085% |
| $Al_2O_3$ | 0.06% |

The material described above had the particle-size composition given in Table 7 which follows, obtained by screening into size fractions.

TABLE 7

| 0 to 0.07 mm | 24 wt. % |
|---|---|
| 0.07 to 0.12 mm | 6.5 wt. % |
| 0.12 to 0.25 mm | 10.5 wt. % |
| 0.25 to 0.5 mm | 10 wt. % |
| 0.5 to 1.0 mm | 12.0 wt. % |
| 1 to 2 mm | 14.5 wt. % |
| 2 to 4 mm | 22.5 wt. % |

The rammed density of the material was found to be 4.4 g/cm³. The sintering behavior was investigated by the same procedure as in Example 1. The results are presented in Table 8 below.

TABLE 8

| Firing temperature °C. | Holding time h | Bulk density DIN 51065 g/cm³ | Water uptake DIN 51056 Wt. % | Porosity (as open pores) % by vol. | Cold crushing strength DIN 51067 N/mm² |
|---|---|---|---|---|---|
| 1600 | 1 | 4.30 | 5.7 | 24.5 | 23.5 |
| 1650 | 1 | 4.56 | 4.4 | 20.1 | 51.3 |
| 1700 | 1 | 4.55 | 4.6 | 20.9 | 52.3 |
| 1750 | 1 | 4.56 | 4.5 | 20.5 | 67.1 |

In both examples, the material was placed between the furnace wall and the metal form in the usual manner, by hand ramming in layers, care being taken to avoid segregation with respect to the particle-size distribution.

In melting a high-chromium cast special steel in a test series of 120 heats with a furnace lining according to Example 1, eight times the useful life of a spinel-forming high-alumina lining (10 to 15% MgO, rest $Al_2O_3$) was secured.

Throughout the melting tests, the lining retained a smooth, unpenetrated wall. The substantial reduction of the percentage of castings which had nonmetallic inclusions represented an improvement of the quality of the cast special steel, and considerable economies were realized in the cost of finishing the castings.

As is apparent from Tables 4 and 8 of Examples 1 and 2, the material must have a sintering temperature of at least 1650° C. in order to possess adequate initial resistance to erosion by the metal bath and to attack by slags. An appropriate particle-size composition based on judicious selection of size fractions therefore is essential if a high packing density and, after the crucible has become sintered, sufficient strength are to be secured.

In the melting of high-alloy special steels, alloys and pure metals with the crucible lining described, it was found that the pure zirconium oxide lining reacts neutral and that there is much less infiltration of slag and metal than in the case of spinel-forming high-alumina materials (10 to 15 weight percent MgO added). The use of this lining based on zirconium oxide has made it possible for the first time to use a furnace lining 50 mm thick down to a final wall thickness of 10 mm. Operating an open induction furnace down to a crucible-wall thickness of 10 mm has permitted much more rapid heating of the melt and, because of the higher volume of the melt, has resulted in a substantial energy saving.

The effect which deoxidizers (such as Al and Si) in the steel melt have on the crucible lining poses a special problem since the resultant slag forms a chemically aggressive deposit on the inner wall of the crucible. When spinel-forming high-alumina ramming materials are used, such encrustation by $Al_2O_3$ or $SiO_2$ is very pronounced because of the lower refractoriness of the crucible. Moreover, the formation of low-melting compounds results in premature wear.

Melting down the buildup with calcium silicide will have a pronounced erosive effect on a high-alumina crucible since the material then sinters through more markedly. Moreover, with such materials removal of the deposit will not leave a smooth crucible wall. With the material in accordance with the invention, on the other hand, the encrustation can be melted down to leave a clean and smooth wall, and a 20 to 30% reduction in melting times can thus be achieved.

A further advantage of the material in accordance with the invention is that when the crucible is used down to a minimum wall thickness, the end of the useful life of the crucible is indicated by a fluctuating current consumption. Because of this effect, there have been no reports so far of ruptures of crucibles having linings in accordance with the invention that would have resulted in an untimely failure of the crucible, as is often the case with other crucible linings.

It will be understood that the specification and examples are illustrative but not limitative of the present invention and that other embodiments within the spirit and scope of the invention will suggest themselves to those skilled in the art.

What is claimed is:

1. A superrefractory dry ramming material based on zirconium oxide for the lining of induction-type crucible furnaces consisting essentially of a zirconium oxide low in $SiO_2$ and conventionally stabilized with CaO, MgO, $Y_2O_3$, rare earths or their mixed oxides which has a particle size ranging up to 8 mm, and from 5 to 40 weight percent finely divided monoclinic, fused zirconium oxide containing less than 0.5 eight percent $SiO_2$ the superrefractory material having a rammed density of at least 4.3 g/cm$^3$.

2. Superrefractory material of claim 1 wherein said particle size ranges up to 4 mm.

3. Superrefractory material of claim 1 wherein said weight percent of the monoclinic fused zirconium oxide ranges from 10 to 20.

4. Superrefractory material of claim 1 wherein said weight percent $SiO_2$ ranges up to 0.2.

5. Superrefractory material of claim 1, wherein the chief component is a fully stabilized zirconium oxide containing from 3.7 to 5 weight percent CaO and/or MgO.

6. Superrefractory material of claim 5, wherein the monoclinic, fused zirconium oxide has a particle size ranging from 0 to 0.06 mm and an $SiO_2$ content of 0.2 weight percent or less.

7. The superrefractory material of claim 1 having a rammed density of at least 4.3 g/cm$^3$ and being composed of the following particle-size fractions:
0 to 0.07 mm—15 to 30 wt. %
0.07 to 0.12 mm—5 to 15 wt. %
0.12 to 0.25 mm—5 to 15 wt. %
0.25 to 0.5 mm—5 to 15 wt. %
0.5 to 1.0 mm—5 to 15 wt. %
1.0 to 2.0 mm—5 to 15 wt. %
2.0 to 4.0 mm—15 to 30 wt. %.

* * * * *

UNITED STATES PATENT AND TRADEMARK OFFICE
CERTIFICATE OF CORRECTION

PATENT NO. : 4,513,089
DATED : April 23, 1985
INVENTOR(S) : Peter Kummer, et al.

It is certified that error appears in the above-identified patent and that said Letters Patent is hereby corrected as shown below:

Claim 1, line 8 "eight" should be -- weight --.

Signed and Sealed this

Twenty-ninth Day of October 1985

[SEAL]

Attest:

DONALD J. QUIGG

*Attesting Officer*

*Commissioner of Patents and Trademarks—Designate*